United States Patent Office 3,785,957
Patented Jan. 15, 1974

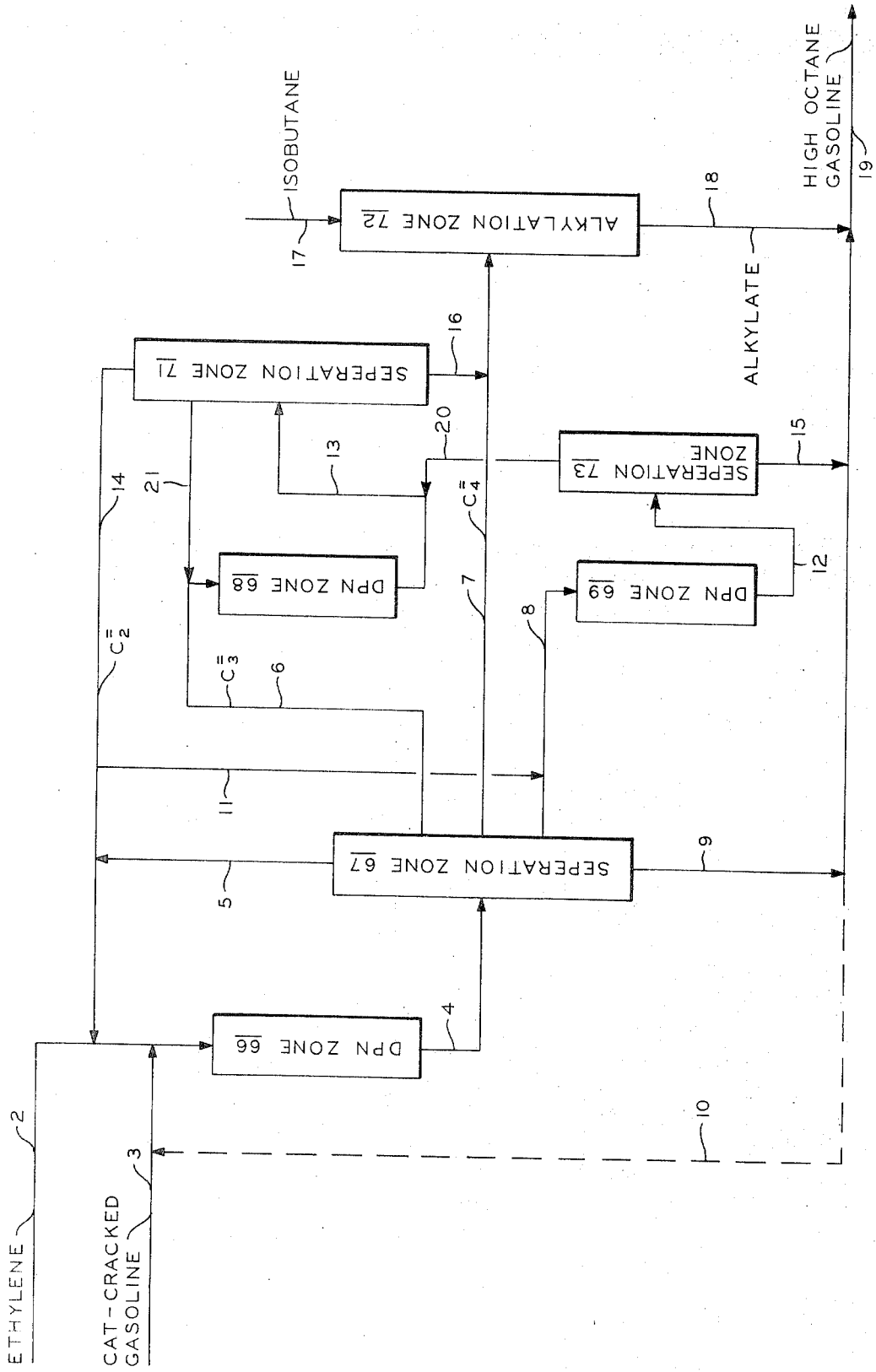

3,785,957
MULTISTAGE CLEAVAGE OF OLEFINS TO PRODUCE HIGH OCTANE GASOLINE
Robert L. Banks, Bartlesville, Okla., assignor to Phillips Petroleum Company
Filed Jan. 3, 1972, Ser. No. 214,649
Int. Cl. C10g 37/00
U.S. Cl. 208—49                10 Claims

ABSTRACT OF THE DISCLOSURE

A process for increasing the octane value of olefin-containing gasoline streams comprises disproportionating the olefinic gasoline with ethylene, separating the effluent to provide a propylene stream, a butene stream, a $C_5$ or $C_5$–$C_6$ olefin stream, and a $C_6^+$ or $C_7^+$ gasoline stream, disproportionating the $C_5$ or $C_5$–$C_6$ olefin stream with ethylene to provide additional propylene and butenes, optionally disproportionating the produced propylene to provide additional ethylene and butenes, alkylating all the produced butenes with isobutane to provide a high octane alkylate and combining the high octane alkylate, and $C_6^+$ or $C_7^+$ olefin gasoline streams to provide the high octane gasoline stream.

BACKGROUND OF THE INVENTION

Field of the invention

This invention relates to olefin disproportionation. In a further aspect this invention relates to a method of increasing the octane value of olefinic gasoline streams using olefin disproportionation and alkylation steps.

Description of the prior art

The reaction of olefinic materials to produce other olefinic materials wherein the reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, and wherein the two new double bonds can be on the same or different molecules, has been called "the olefin reaction." The breaking and formation of these bonds can be visualized by using a mechanistic scheme involving a cyclobutane transition state. Thus, two unsaturated pairs of carbon atoms combine to form a 4-center (cyclobutane) transition state which then disassociates by breaking either set of opposing bonds. This reaction can be illustrated by the following equations:

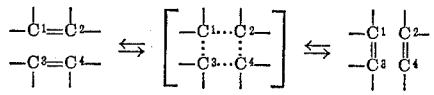

Other terms have been utilized to describe the reactions of olefinic materials which are within the scope of the olefin reaction as defined above. These include such terms as "olefin disproportionation," "olefin dismutation," "transalkylidenation," and "olefin metathesis." Throughout the specification and claims the term "olefin disproportionation" is used as a matter of choice and is deemed to be equivalent to the above-mentioned terms, including the olefin reaction terminology. Numerous catalyst systems have been reported which effect this reaction, including the catalyst of U.S. 3,261,879, Banks (1966), and U.S. 3,365,513, Heckelsberg (1968).

One important embodiment of the olefin disproportionation reaction is the process wherein propylene is smoothly and efficiently converted to approximately equimolar amounts of ethylene and n-butenes. This can be very efficiently done over a variety of catalysts and conditions.

Still another important aspect of the olefin disproportionation reaction is the embodiment wherein a mixture of ethylene and a suitable higher olefin is disproportionated. The presence of ethylene in the reaction mixture changes the nature of the olefinic products such that the higher olefin is converted into a lower olefin. Such a result has been termed "ethylene cleavage" or "etheneolysis." Thus, olefins such as n-pentenes can be converted to lower olefins such as propylene and butenes. This result is often promoted by the presence of some double bond isomerization activity within the reaction zone.

Today, the oil industry faces the problem of upgrading the octane values of gasolines produced in refinery operations. This problem had its genesis in the heavily industrialized countries of the world because of pollution of the atmosphere by automobile exhaust emissions. Technological development to abate such pollution has resulted in the use of catalytic exhaust gas treators. These catalytic mufflers employ conversion catalysts which are sensitive to lead compounds in the exhaust. Thus the use of lead in gasolines has been greatly curtailed. Therefore, the producers of gasolines have been requested to upgrade the octane value of their refinery gasolines to meet the high performance requirement of the modern internal combustion engine without the assistance of added alkyl lead compounds.

OBJECTS OF THE INVENTION

It is an object of this invention to produce a high octane gasoline. Other objects and advantages of the present invention will be apparent to those skilled in the art from the following summary of the invention, detailed description of the invention, and the claims.

SUMMARY OF THE INVENTION

I have discovered that a high octane gasoline can be prepared from an olefin containing gasoline stock, ethylene and isobutane using a combination of olefin disproportionation and alkylation steps. My process comprises converting a mixture of an olefinic containing gasoline stream and ethylene in the presence of an olefin disproportionation catalyst to produce a stream comprising propylene, butenes, and a $C_5^+$ gasoline fraction. This produced stream is then separated to provide individual streams of ethylene, propylene, butenes, a $C_5$ or $C_5$–$C_6$, olefin containing fraction, and a $C_6^+$ or $C_7^+$ gasoline stream. The $C_5$ or $C_5$–$C_6$ stream is cleaved with ethylene in a second olefin disproportionation reaction zone to produce additional quantities of ethylene, propylene, and butenes. The effluent from this reaction is separated to provide the individual streams of these products. The produced butene streams are combined and passed to an alkylation zone wherein they are alkylated with isobutane to provide a high octane alkylate. The high octane alkylate is then combined with the $C_6^+$ or $C_7^+$ gasoline stream to provide the high octane gasoline product of my process.

In a preferred embodiment of my invention, an additional olefin disproportionation step is carried out wherein the produced propylene is converted to additional ethylene and butenes, the ethylene being employed in the cleavage reaction zones and the butenes being combined with other produced butenes for alkylation.

My process provides an increase in the octane values and an increase in the volume of gasoline when the product gasoline of my process is compared with the olefinic gasoline starting material used in my process.

BRIEF DESCRIPTION OF THE DRAWING

The sole figure of the drawing is a simplified flow diagram of one embodiment of the process of my invention wherein a high octane gasoline is prepared from a cat-cracked gasoline, ethylene, and isobutane.

DETAILED DESCRIPTION OF THE INVENTION

A starting material for the process of my invention is an olefinic gasoline having at least about 10 weight percent of olefin hydrocarbons. The gasoline will preferably have a boiling end point which does not exceed 450° F. The olefin content is advantageously from about 30 to about 70 weight percent. Such streams are readily available in refinery operations and are generally available as a product from a catalytic cracker unit. Preferably, the feed is a full range cat-cracked gasoline. However, a full range cat-cracked gasoline can be fractionated to provide suitable gasoline fractions for my process which are high in olefin content and low in aromatics.

In the disproportionation steps of my invention, any catalyst which has the ability to disproportionate propylene to ethylene and butenes can be used. Those solid catalysts which exhibit disproportionation activity at a temperature in excess of 400° F. are particularly suitable because they are characteristically more resistant to catalyst poisons sometimes associated with the feed.

Accordingly, I prefer to use catalysts such as molybdenum oxide on alumina, on silica or on aluminum phosphate; tungsten oxide on silica, on alumina, or an aluminum phosphate; or rhenium oxide on alumina or on aluminum phosphate. The preparation, activation, maintenance and use of these catalysts have been reported in the prior art.

Of course, these catalysts can also be modified by various treatments also reported in the prior art. For example, treatment with alkali metals or alkaline earth metals, or admixtures with suitable double bond isomerization catalysts, or treatment with reducing gases such as $H_2$ or other gases including CO, all have been reported. Any of these treatments can be employed in my process.

The conditions in each of the olefin disproportionation zones include reaction pressures in the range 0–2000 p.s.i.g., preferably 25–500 p.s.i.g.; space rates of 0.1–1000 WHSV, preferably 1–500 WHSV, and reaction temperatures broadly in the range of −60 to about 1200° F. but generally dependent upon the specific olefin disproportionation catalyst chosen. The following table illustrates some reaction temperatures for some specific catalysts.

| Disproportionation catalyst | Temperature, ° F. | |
|---|---|---|
| | Broad | Preferred |
| $WO_3/SiO_2$ | 400–1,100 | 600–900 |
| $MoO_3/SiO_2$ | 400–1,100 | 800–1,000 |
| $MoO_3/Al_2O_3$ | 150–500 | 250–400 |
| $WO_3/Al_2O_3$ | 100–750 | 550–650 |
| $Re_2O_7/Al_2O_3$ | −60–1,000 | 100–500 |
| $WO_3/AlPO_4$ | 600–1,200 | 800–1,000 |
| $Re_2O_7/AlPO_4$ | −60–1,000 | 50–250 |
| $MoO_3/AlPO_4$ | 600–1,200 | 800–1,000 |

Because of its high activity and high durability, the $WO_3/SiO_2$ catalyst is the presently preferred olefin disproportionation catalyst.

Of particular importance to my process is the admixture of a disproportionation catalyst with a suitable solid double bond isomerization catalyst because these combination catalysts generally provide increased conversions particularly when ethylene is in the feed olefin mixture. Some suitable double bond isomerization catalysts are MgO, ZnO, and alumina. Thus, my most preferred catalyst is a combination of magnesium oxide and tungsten oxide on silica where the amount of double bond isomerization catalyst is from about 2:1 to 10:1 parts by weight per part of the olefin disproportionation catalyst. The amount of ethylene used in the disproportionation zones can be in the range of from about 1 to about 30, preferably 5 to about 20 moles of ethylene per mole of olefins in the feed.

Although not absolutely necessary for my process, it is preferred that the olefin disproportionation steps be operated under reaction conditions wherein the unbranched olefins in the feed mixture are converted to a greater extent than the branched olefins in the feed mixture.

This advantage is obtained by adjusting the reaction conditions of the olefin disproportionation reaction zone to provide a conversion of the normal feed olefins within the range of from 30 to 50 percent. At this level, the conversion of n-olefins is much greater than the conversion of isoolefins. Thus, the effluent from the disproportionation zone can retain a significant proportion of the higher octane-rated branched olefins, while the newly formed ethylene, propylene and butenes result primarily from the conversion of the lower octane-rated linear olefins.

Those skilled in the olefin disproportionation art are aware that the extent of conversion is largely dependent upon the reaction conditions such as temperature, the catalyst selected, and reaction time or space velocity. Accordingly, the exact conditions employed within the reaction zone will be dependent, for example, on the particular catalyst chosen and on the temperature range at which it exhibits optimum activity and selectivity. Preferably, however, the particular olefin disproportionation catalyst is employed at a temperature which is optimum for that catalyst. The space rate is then adjusted to bring the conversion level within the above specified range, preferably about 40 percent.

Alternatively, when it is not desired to retain a significant quantity of branched $C_5$–$C_6$ olefins in the gasoline, the temperature and space rate conditions can be made more severe to provide a high level of conversion.

The alkylation steps employed in my process are equally well known in the prior art. Thus the butene-isobutane alkylation step can employ any suitable catalyst reported in the prior art to convert isobutane and butenes (in the presence or absence of propylene) to high octane alkylate. Suitable catalysts include sulfuric acid, $AlCl_3$, $BF_3$, HF, and the like, and mixtures thereof. The conditions will depend on the catalyst. For example, in a HF-alkylation process, a typical temperature is 80–100° F., with a 1–10 minute contact time, and with an isobutane to olefin ratio of 6–15.

My invention can be better understood by reference to the drawing. The figure illustrates a preferred embodiment of my invention wherein a high-octane gasoline is prepared from ethylene, isobutane and a full range catalytic-cracked gasoline. This process uses disproportionation zones (dpn. zones) 66, 68, and 69, alkylation zone 72, and separation zones 67, 71 and 73.

A full range cat-cracked gasoline containing at least 10 weight percent olefin hydrocarbons is passed via line 3 into line 2 wherein it is admixed with ethylene. The mixture passes into disproportionation zone 66 via line 2. Therein, ethylene reacts with the olefins in the gasoline to produce a stream containing ethylene, proplyene butenes, and higher olefin hydrocarbons. The effluent from zone 66 is withdrawn and passed to separation zone 67.

Within separation zone 67, five streams are provided. An ethylene stream is removed in line 5 for passage to line 14 and recycle to zone 66 via line 2. If desired, some or all of the ethylene in line 5 can be passed to line 11 for use in disproportionation zone 69 as discussed below.

A propylene stream is removed from zone 67 via line 6 and passed to disproportionation unit 68. A butene stream is removed from unit 67 and passed via line 7 to alkylation zone 72. An amylene stream is removed via line 8 and passed to disproportionation zone 69. And a $C_6^+$ low olefin gasoline stream is removed from line 9 as part of the final product blend of the process. If desired, a portion or all of this latter stream can be returned via line 10 to line 3 and thence into zone 66 for further conversion therein.

The amylene stream in line 8 is admixed with ethylene from line 11 and passed into disproportionation unit 69. The ethylene to this unit may include make up ethylene from line 2 (not shown) if desired. The ethylene cleavage reaction of the mixed amylenes in zone 69 produces additional quantities of propylene and butenes. The effluent from unit 69 is withdrawn via line 12 and passed to separation zone 73. Optionally, zone 73 can be an integral part of separation zone 67. Zone 73 provides two streams, a lighter stream 20 containing ethylene, propylene and butenes and a heavier stream 15 containing $C_5^+$ hydrocarbons. Line 20 passes from zone 73 to line 13 and hence into separation zone 71. Line 15 passes from zone 73 into line 19 as an additional portion of the low olefin high octane gasoline product of the process. Of course, it is within the scope of my invention that zone 73 could also provide a separate $C_5$ stream for recycle to disproportionation zone 69.

The particular olefin disproportionation catalyst employed in the above mentioned disproportionation zones 66 and 69 are not critical. However, it is generally preferred, because of the presence of ethylene in each of these catalytic zones, that the solid olefin disproportionation catalyst be admixed with a solid double bond isomerization catalyst to provide generally increased cleavage conversions of olefin hydrocarbons. Accordingly, a mixture of tungsten oxide on silica catalyst and magnesium oxide catalyst is preferred for these zones.

In disproportionation zone 68, propylene in line 6 from separation zone 67 is converted to ethylene and butenes. The effluent of zone 68 is withdrawn in line 13, admixed with the lighter olefin stream 20 from zone 73 and passed into separation zone 71. Therein, propylene is recovered and returned to zone 68 through line 21. Ethylene is removed by way of line 14 and passed to zone 69 via lines 8 and 11 and to zone 66 via line 2. Butenes are removed from zone 71 in line 16 and passed into line 7 for conversion in alkylation zone 72.

In alkylation zone 72, the butenes are alkylated with isobutane from line 17 in the presence of suitable alkylation catalyst such as HF acid.

Since the olefin disproportionation reaction of propylene in zone 68 favors the preparation of butene-2 over butene-1, the alkylation reaction produces a very high octane alkylate which is removed via line 18. This stream is then combined with the $C_6^+$ low olefin gasoline in line 9 to produce the high octane gasoline product of my process in line 19.

It is within the scope of my invention to process a different hydrocarbon fraction in ethylene cleavage unit 69. Thus, a $C_6$ fraction or a $C_5$ and $C_6$ fraction can be converted in this unit rather than an amylene fraction as discussed above. In addition, it may be advisable to hydroisomerize the butenes in line 7 prior to alkylation to provide increased yields and higher octane of the alkylate in line 18.

Those skilled in the art will understand that the simplified flow diagram of my process has omitted many items which are actually needed to operate the process. Thus, the discussion of pumps, valves, controls, and the like, has been omitted to simplify the discussion of my invention. The catalytic and separation zones referred to above may in practice contain multiple reactors in series, or multiple fractionators or other separation devices in a combination arrangement which provides the process streams referred to above. The use of these apparatus and other steps is well within those skilled in the art. It may be advantageous to hydrotreat the cat-cracked gasoline under very mild conditions to prevent poisoning of the disproportionation catalysts. Similarly, it may be advisable to treat the feed by percolation through activated beds of materials such as alumina, mole sieves, magnesia, and the like, at low temperatures to purify contaminants of the feed to the first disproportionation zone.

My invention can be further understood by the following examples which are presented to illustrate the process of my invention. They should not be construed to limit the disclosure of my invention as provided above.

EXAMPLE I

A high octane gasoline is prepared from a full range cat-cracker gasoline, ethylene, and isobutane as depicted in the figure of the drawing. A full range cat-cracked gasoline having the following properties is used as the feed to disproportionation zone 66.

TABLE I

Properties of cat-cracker gasoline

Research octane, clear _____ 88.7
Motor octane, clear _____ 78.2
API gravity at 60° F. _____ 57.8
Bromine number _____ 70
ASTM distillation (° F.):
  IP _____ 112
  10% _____ 149
  50% _____ 239
  90% _____ 377
  EP _____ 429
GLC analysis (wt. percent):
  $C_4^-$ _____ 0.5
  n-Olefins _____ 13.5
  Iso-olefins _____ 30.0
  n-Saturates _____ 4.2
  Iso-saturates _____ 27.4
  Aromatics _____ 24.4

The olefin disproportionation catalyst which is used in each of zones 66, 68, and 69 in a fixed bed catalyst arrangement is $WO_3/SiO_2$ containing 8.5 wt. percent $WO_3$ and 91.5 wt. percent silica. In each of the zones the catalyst is activated in place (or regenerated) by heating the composition to a temperature of from 1000–1200° F. for a period of from 1–4 hours, followed by flushing the catalyst with $N_2$ and treatment with carbon monoxide at 1100° F. for 15 minutes, followed by cooling to reaction temperature with $N_2$ flushing. The conditions of each of zones 66, 68, and 69 are set forth below in Table II.

TABLE II.—DISPROPORTIONATION CONDITIONS OF TREATMENT

| Zone | 66 | 68 | 69 |
|---|---|---|---|
| Temperature, ° F. | 750 | 725 | 750 |
| P.s.i.g. | 300 | 325 | 350 |
| WHSV | 50 | 30 | 95 |
| Lbs. of $WO_3/SiO_2$ | 3,200 | 1,370 | 2,500 |

Alkylation zone 72 uses an HF acid alkylation catalyst operated under conditions of temperature of 92° F. and a contact time of 7 minutes. The unit produces a high octane alkylate in the following yield and having the following octane values.

Yield, barrels/barrel of butenes _____ 1.75
Research octane number, clear _____ 96.8
Motor octane number, clear _____ 94.0

The material balance of Table III below shows the composition of the streams as depicted in the figure of the drawing.

TABLE III.—POUNDS PER HOUR

| Stream number | 2 | 3 | 4 | 5 | 6 | 7 | 8 | 9 | 17 |
|---|---|---|---|---|---|---|---|---|---|
| Hydrocarbon: | | | | | | | | | |
| Ethylene | 7,820 | | 69,900 | 69,900 | | | | | |
| Propylene | | | 8,460 | | 8,460 | | | | |
| Isobutane | | 60 | 90 | | | 90 | | | 22,000 |
| Butenes | | 350 | 8,110 | | | 8,110 | | | |
| Pentanes | | 2,960 | 2,960 | | | | 2,960 | | |
| Pentenes | | 7,590 | 8,870 | | | | 8,870 | | |
| $C_6^+$ gasoline | | 70,240 | 62,010 | | | | | 62,010 | |
| Total | 7,820 | 81,200 | 160,400 | 69,900 | 8,460 | 8,200 | 11,830 | 62,010 | 22,000 |

| Stream number | 11 | 12 | 13 | 14 | 15 | 16 | 19 | 20 | 21 |
|---|---|---|---|---|---|---|---|---|---|
| Hydrocarbon: | | | | | | | | | |
| Ethylene | 12,900 | 9,300 | 5,080 | 14,380 | | | | 9,300 | |
| Propylene | | 6,770 | 24,000 | | | | | 6,770 | 30,770 |
| Isobutane | | | | | | | | | |
| Butene | | 3,600 | 10,150 | | | | 13,750 | 3,600 | |
| Pentanes | | 2,960 | | | 2,960 | | | 2,960 | |
| Pentenes | | 2,130 | | | 2,130 | | | 2,130 | |
| Gasoline | | | | | | | | 105,930 | |
| Total | 12,900 | 24,760 | 39,230 | 14,380 | 5,090 | 13,750 | 111,020 | 19,670 | 30,770 |

The above data demonstrate that a stream comprising 70240 lbs./hour of $C_6^+$ cat-cracked gasoline, 7590 lbs. per hour of pentenes, 2960 lbs. per hour of pentanes, 350 lbs. per hour of butenes and 60 lbs. per hour of isobutane, together with 7820 lbs. per hour of ethylene and 22000 lbs. per hour of isobutane provide 111,020 lbs. per hour of high octane low olefin gasoline.

EXAMPLE II

A process is carried out in the same manner as reported in Example I except that the second stage cleavage of the $C_5$ fraction in unit 69 is not carried out. The results of this example are reported below in Table IV and compared the effect of multistage cleavage with ethylene by invention.

TABLE IV

Volume and octane values based on 1,000 barrels of cat-cracker gasoline feed

| Processing steps | Bbls. produced | RON | MON | Percent olefin |
|---|---|---|---|---|
| None | 1,000 | 88.7 | 78.2 | 43.5 |
| Single-stage cleavage | 1,269 | 88.9 | 81.7 | 30.9 |
| Multi-stage cleavage | 1,400 | 91.1 | 83.9 | 19.0 |

The above data show that my process provides a 40% increase in the volume of gasoline based on the feed olefin gasoline volume and a significant increase in the octane value of the product.

I have also observed that it is advantageous to use the mixed double bond isomerization catalyst-disproportionation catalyst in zones 66 and 69 to achieve generally higher per pass conversions of the feed to these units.

Reasonable variations and/or modifications of my process will be apparent to those skilled in the art without departing from the spirit and scope of my invention. It is understood that various steps such as hydroisomerization, hydrotreatment of feeds for the purpose of purification thereof and other processing steps can be used in conjunction with my process without departing from the scope thereof.

I claim:

1. A process for the preparation of high octane gasoline from an olefin containing gasoline stock comprising a mixture of hydrocarbons having at least 10 weight percent olefin hydrocarbons, ethylene, and isobutane which comprises
   (a) cleaving the mixture of hydrocarbons with ethylene in the presence of an olefin disproportionation catalyst to provide an effluent containing ethylene, propylene, butenes, and a first $C_5^+$ hydrocarbon fraction,
   (b) separating the effluent of step (a) to provide separate streams of ethylene, propylene, butenes, and a $C_5$ or $C_5$-$C_6$ hydrocarbon fraction, and a first heavier low olefin gasoline fraction,
   (c) cleaving the $C_5$ or $C_5$-$C_6$ hydrocarbon fraction with ethylene in the presence of an olefin disproportionation catalyst to provide an effluent containing additional ethylenes, propylene, and butenes and a second heavier hydrocarbon fraction,
   (d) separating the effluent of step (c) to provide separate streams of ethylene, propylene, and butenes and a second heavier low olefin gasoline fraction,
   (e) combining the butenes streams of steps (b) and (d) and passing the same to an alkylation zone in admixture with isobutane to provide a high octane alkylate, and
   (f) combining the high octane alkylate of step (e) and the first and second heavier low olefin gasoline streams of steps (b) and (d) to provide a high octane low olefin gasoline having an increased volume and higher octane value than the olefin containing feed to the process.

2. The process of claim 1 wherein at least a part of the ethylene stream of step (b) is returned to step (a).

3. The process of claim 1 wherein at least a part of the ethylene stream of step (d) is returned to step (c).

4. The process of claim 1 wherein at least part of the ethylene streams of steps (b) and (d) are returned to steps (a) and (c).

5. The process of claim 1 further including the steps of
   (g) passing the propylene streams of (b) and (d) in the presence of an olefin disproportionation catalyst to provide an effluent comprising additional ethylene, butenes, and unconverted propylene,
   (h) separating the effluent of step (g) to provide separate streams of propylene, ethylene, and butenes,
   (i) passing the ethylene stream of step (h) to steps (a), (c), or both, and
   (j) passing the butenes stream of step (h) to the alkylation zone in admixture with the butenes stream from steps (b) and (d) to provide additional high octane alkylate.

6. The process of claim 5 wherein propylene stream of step (h) is returned to step (g).

7. The process of claim 5 wherein the olefin disproportionation catalyst used in steps (a), (c), and (g) comprises molybdenum oxide, tungsten oxide, or rhenium oxide on silica, alumina, or aluminum phosphate.

8. The process of claim 7 wherein the mixture of hydrocarbons containing at least 10 weight percent olefin is a cat-cracked gasoline having an end boiling point which does not exceed about 450° F. and contains from about 20 to about 70 weight percent olefinic hydrocarbons.

9. The process of claim 1 wherein the amount of ethylene used in steps (a) and (c) is from about 1 to about 20 moles of ethylene per mole of olefin in the hydrocarbon feed.

10. The process of claim 7 wherein the olefin disproportionation catalyst in each of steps (a), (c) and (g) is tungsten oxide on silica.

References Cited
UNITED STATES PATENTS 3,704,334 11/1972 Dixon et al. _____ 260—683 D
3,696,165 10/1972 Reusser _____ 260—683 D HERBERT LEVINE, Primary Examiner U.S. Cl. X.R.

260—683 D